US010608719B2

(12) United States Patent
Rowell et al.

(10) Patent No.: US 10,608,719 B2
(45) Date of Patent: Mar. 31, 2020

(54) ANTENNA ARRAY, METHOD FOR TESTING A DEVICE UNDER TEST AND TEST SYSTEM

(71) Applicant: Rohde & Schwarz GmbH & Co. KG, Munich (DE)

(72) Inventors: Corbett Rowell, Munich (DE); Hendrik Bartko, Munich (DE); Adam Tankielun, Munich (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 216 days.

(21) Appl. No.: 15/291,451

(22) Filed: Oct. 12, 2016

(65) Prior Publication Data
US 2018/0102859 A1    Apr. 12, 2018

(51) Int. Cl.
H04B 17/29    (2015.01)
H04B 7/06    (2006.01)
H04B 7/00    (2006.01)
H01Q 3/26    (2006.01)

(52) U.S. Cl.
CPC ............ H04B 7/0615 (2013.01); H04B 7/00 (2013.01); H04B 7/0691 (2013.01); H01Q 3/267 (2013.01)

(58) Field of Classification Search
None
See application file for complete search history.

(56) References Cited

U.S. PATENT DOCUMENTS

| | | | | |
|---|---|---|---|---|
| 6,707,433 B2* | 3/2004 | Ohtsuka | ................... | H01Q 3/26 343/826 |
| 6,768,475 B2* | 7/2004 | Ohtsuka | ................. | H01Q 3/242 343/770 |
| 9,002,287 B2* | 4/2015 | Mow | ...................... | G01R 29/10 455/13.3 |
| 9,116,232 B2* | 8/2015 | Goel | .................... | H04B 17/318 |
| 9,488,685 B2* | 11/2016 | Kyosti | .................. | H01Q 21/20 |
| 9,794,009 B1* | 10/2017 | Olgaard | ................. | H04B 17/29 |
| 10,228,443 B2* | 3/2019 | Kulaib | ....................... | G01S 5/04 |
| 2011/0084887 A1* | 4/2011 | Mow | ...................... | G01R 29/10 343/703 |
| 2012/0225624 A1* | 9/2012 | Kyosti | ................. | H01Q 3/2605 455/67.11 |
| 2014/0273873 A1* | 9/2014 | Huynh | ................. | H04B 17/008 455/67.12 |
| 2015/0054687 A1* | 2/2015 | Reed | .................. | H04B 17/0085 342/361 |
| 2018/0062971 A1* | 3/2018 | Kyosti | ................. | H04B 7/0413 |

FOREIGN PATENT DOCUMENTS

WO    2008/067251 A2    6/2008

* cited by examiner

*Primary Examiner* — Tuan A Tran
(74) *Attorney, Agent, or Firm* — Schwabe, Williamson & Wyatt, P.C.

(57) ABSTRACT

An antenna array is described which comprises a plurality of antenna elements. Said antenna elements are grouped in at least two antenna groups. Said antenna elements of each antenna group emit coherent signals. Said antenna groups are arranged symmetrically to a central point of said antenna array. Further, a method for testing a device under test and a test system are described.

19 Claims, 2 Drawing Sheets

ANTENNA ARRAY, METHOD FOR TESTING A DEVICE UNDER TEST AND TEST SYSTEM

TECHNICAL FIELD

The invention relates to an antenna array, a method for testing a device under test as well as a test system for testing a device under test, in particular a communication device.

BACKGROUND OF THE INVENTION

Antenna arrays usually comprise several spatially separated antenna elements which are used for transmitting and/or emitting electromagnetic waves, in particular radio waves. The different antenna elements are connected together such that the currents for generating electromagnetic waves or generated of electromagnetic waves received are in a specified relationship, in particular their phases and amplitudes. For transmitting purposes, the amplitudes and the phases of the electromagnetic waves emitted by the individual antennas are adjusted for each antenna such that the whole antenna array is deemed to be one single antenna element emitting an electromagnetic signal having certain characteristics.

The antenna arrays, also called phased arrays, as well as the test systems comprising an antenna array are used for measuring and/or testing purposes of communication devices or systems. As the antenna array has a plurality of individual antenna elements, the directional gain of the antenna is increased.

For instance, calibration and/or type-approval tests can be performed by using such an antenna array and the corresponding test system, respectively. Accordingly, antenna arrays and test systems are used for research and development purposes such as 4.5 G and/or 5 G base stations and user equipments (UE). Generally, these base stations and user equipments relate to communication devices or systems.

A drawback of the known antenna arrays and the corresponding test systems is the complexity resulting in high costs for establishing and using the antenna arrays and test systems for measurements and calibrations, respectively.

SUMMARY OF THE INVENTION

The invention provides an antenna array comprising a plurality of antenna elements, said antenna elements being grouped in at least two antenna groups, said antenna elements of each antenna group emitting coherent signals, said antenna groups being arranged symmetrically to a central point of said antenna array.

The invention is based on the finding that the amount of equipment for testing purposes can be reduced by using an antenna array having several antenna groups which are arranged in a symmetrical manner. This reduces the costs for establishing the test system. Accordingly, the costs for testing can also be reduced. Moreover, the size of the antenna array is reduced with respect to antenna arrays used in the state of the art having similar characteristics. The grouping of the several individual antenna elements ensures that the number of different phase coherent signals can be reduced in total.

Generally, said antenna array may be configured to emit and/or receive plane waves in the near field of the antenna array. Thus, the antenna elements, in particular the antenna groups, are arranged and controlled such that the electromagnetic waves emitted are plane waves at a distance being in the near field of the antenna array. Thus, far field conditions of the communication devices or systems under test can be tested in proximity of the antenna array.

In other words, said antenna array may be at least a part of an axially symmetric plane wave converter. Thus, plane waves can be generated easily, in particular in the near field of the antenna array.

According to an aspect, said coherent signals have the same phase and the same amplitude. It is ensured that the several antenna elements of each antenna group emit signals being the same regarding their characteristics. Again, the number of different phase coherent signals is reduced as the different antenna groups emitting signals being equal in phase and amplitude.

Furthermore, said antenna groups may be axially symmetric groups. This simplifies the generation of plane waves, for instance. In general, the total antenna array may emit signals being substantially axially symmetrical.

According to another aspect, said antenna groups are arranged such that an n-fold symmetry is provided wherein n is minimum 3 and an integer value. The symmetrical characteristics of the antenna array can be defined by this symmetry, also known as rotational symmetry. Thus, the antenna array can be rotated by 360°/n with respect to a certain point, namely the central point of the antenna array, without changing the characteristics of the antenna array due to its rotational symmetry. As n is larger than 3 and an integer value, a rotation by 120°, 90°, 72°, 60°, and so on is possible. Further, the antenna elements of each antenna group can be arranged in a triangle (n=3) or a square (n=4) wherein the different antenna groups have different sizes resulting in the symmetry with respect to a central point of the antenna array.

According to a certain embodiment, said antenna elements of each antenna group are arranged around a circular ring such that the antenna groups form a circular antenna array. Such an embodiment can be approximated by a full rotational symmetry.

Particularly, each antenna group is connected with at least one line, preferably exact one line. This line is used for leading the currents to the several antenna elements. Depending on the usage of the antenna array, the lines are feed lines or receiving lines. The feed lines are used for feeding the antenna elements with currents generated by a transmitter wherein the generated currents are converted into electromagnetic signals by the antenna elements. The receiving lines are used for transmitting the electromagnetic currents generated by the antenna elements converting the electromagnetic waves received.

According to an embodiment, said antenna array is configured to emit electromagnetic waves in at least two polarization directions, in particular two linear polarization directions. The antenna elements, in particular the antenna groups, can be controlled such that the electromagnetic waves emitted may be vertically or horizontally polarized, for instance. Therefore, the antenna array can also be used to receive differently polarized electromagnetic waves.

Furthermore, said antenna elements may be circular polarized. A circular polarization is preferred as disturbances or interferences of the signals do not have a great influence on the measurements.

Said antenna elements may be arranged in all spatial dimensions. Accordingly, the antenna elements can be arranged in different planes being arranged one after the other. Hence, a three dimensional antenna array is obtained.

Further the invention provides a method for testing a device under test by transmitting and/or receiving signals using an antenna array as described above wherein said antenna elements of one group receive signals and/or emit the same signals in amplitude and phase. Accordingly, the antenna array as described above may be used for testing purposes, in particular testing a communication device or system.

Particularly, said antenna elements of one group emit signals being the same in amplitude and phase. Thus, the whole antenna array only emits as much different signals regarding their characteristics as antenna groups are provided, in particular regarding their phases and amplitudes.

According to an embodiment, said signals emitted via the different antenna groups are weighted differently, in particular in a complex manner. Thus, the currents used for generating the signals to be emitted are weighted depending on the location of the respective antenna group with respect to the central point of the antenna array.

According to another embodiment, said signals received by at least some antenna elements of each antenna group are physically added, in particular said signals received by all antenna elements of each antenna group. Hence a physically added signal for each antenna group is obtained. As the several antenna elements of each antenna group have the same characteristics, in particular phases and amplitudes, the signals received by the antenna elements of each antenna group can be physically added easily.

According to another aspect, said physically added signals are weighted differently. Depending on their location with respect to each other or rather with respect to the central point of the antenna array, the physically added signals are weighted appropriately.

Particularly, said physically added signals may be weighted in a complex manner. Thus, the phases as well as the amplitudes of the signals are weighted individually.

Further, said weighted signals of each group may be physically added. Hence, the signals received by each antenna group are weighted an, afterwards, added such that a common signal is obtained which corresponds to the signal emitted by the device under test and received by the whole antenna array. This signal can be used for further processing.

According to another aspect, the power of said physically added signals is measured for each antenna group and/or phase differences of said physically added signals are measured with respect to each other. This information is also typically used for testing and/or calibration purposes of a communication device or system.

Further, said measured powers and/or phase differences may be added using digital technologies. The power and phase information obtained corresponds to the signal emitted by the device under test. The signals can be processed in real time. Moreover, the operation is simplified.

The invention also provides a test system comprising an antenna array as described above, wherein a transmitter, a receiver or a transceiver is provided that is connected with said antenna array by at least one line transmitting signals between the antenna array and the transmitter, receiver or transceiver. Accordingly, the antenna array can be used for testing purposes as the signals received by the plurality of antenna elements can be processed in the receiver. Alternatively, the transmitter transmits currents via feeding lines to the different antenna groups wherein the currents are converted into electromagnetic waves used for testing or calibration purposes of a device under test. Further, a transceiver can be used which has transmission and receiving properties. Thus, said transceiver can transmit and receive currents appropriately.

According to an aspect, said test system is configured such that said lines are weighted differently, in particular in a complex manner. As already mentioned, the different antenna groups can be weighted in dependence on their distribution on the antenna array. The lines may be transmission lines or feeding lines.

Particularly, said test system is configured such that said complex weightings depend on the frequency and/or time. Certain portions of the signals received or certain signals are weighted stronger which might be of more interest. Thus, the other signal portions or signals may be suppressed.

According to another aspect, said test system comprises attenuators and/or phase shifters using for weighting said signals transmitted via said lines. The attenuators can weight the amplitudes as it reduces the power of the signals received without distorting the waveform. The phase shifters are used for adapting the phases of the signals received.

Generally, said test system may be configured to execute a method as described above.

BRIEF DESCRIPTION OF DRAWINGS

The invention will now be described with reference to an exemplary embodiment which is shown in the enclosed drawing. In the drawings, FIG. 1 schematically shows a test system according to the invention, and FIG. 2 a flow chart illustrating a method for receiving signals according to the invention.

DETAILED DESCRIPTION

Figure 1:
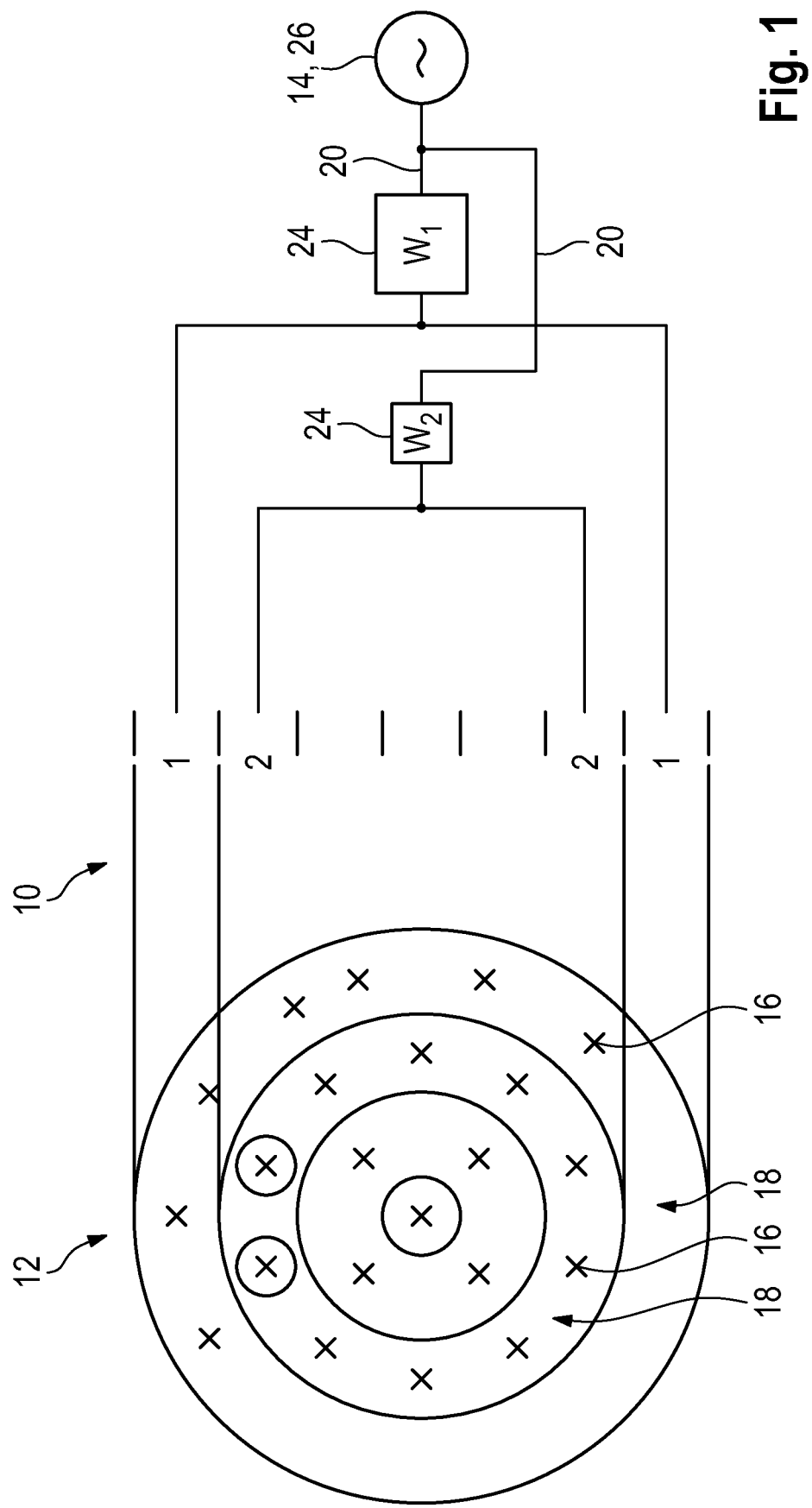

In FIG. 1, a test system 10 is shown which is used for testing and/or calibrating communication devices or communication systems, for instance 4.5 G and 5 G base stations or user equipments.

In the shown embodiment, the test system 10 is used for transmitting signals. Thus, the test system 10 comprises an antenna array 12 being connected with a transmitter 14 transmitting currents used for generating electromagnetic waves (signals) wherein the antenna array 12 converts the currents into electromagnetic waves.

The antenna array 12 has several separately formed antenna elements 16 which are grouped in different antenna groups 18 of the antenna array 12. Each of the antenna groups 18 is connected with the transmitter 14 by exact one line 20 being a feeding line as the antenna array 12 is connected with the transmitter 14. In the shown embodiment, only two lines 20 are exemplary shown for the first and the second antenna groups 18 of the antenna array 12 for illustrating reasons.

The signals transmitted via the antenna elements 16 of each antenna group 18 are coherent signals which have the same phase and the same amplitude. Accordingly, all antenna elements 16 of each antenna group 18 emit signals being equal with respect to each other.

As can be seen in FIG. 1, the antenna groups 18 are symmetrically positioned with respect to a central point 22 of the antenna array 12. Furthermore, the antenna elements 16 are also symmetrically distributed in the respective antenna groups 18 resulting in a so called n-fold symmetry of the antenna array 12, also known as rotational symmetry, wherein n is larger than three and an integer value.

Due to the n-fold symmetry, the antenna array 12 is rotatable by 360°/n with respect to the central point 22 of the antenna array 12 defining the axis of rotation without changing the characteristics of the antenna array 12 due to its rotational symmetry.

For instance, the antenna elements 16 of at least one antenna group 18 can be arranged in a triangle (n=3) or a square (n=4) wherein the different antenna groups 18 have different sizes resulting in the symmetry of each antenna group 18 with respect to the central point 22 of the antenna array 12.

In the shown embodiment, the several antenna elements 16 are arranged around a circular ring such that each antenna group 18 is shaped like a ring resulting in a circular antenna array 12 having a circular radiation pattern. The ring-shaped antenna groups 18 are symmetrical to the central point 22 of the antenna array 12. Accordingly, the antenna groups 18 have different radii. Moreover, the antenna elements 16 of each antenna group 18 have the same distance to the central point 22, in particular the same radius.

In general, the antenna groups 18 are axially symmetrical with respect to the central point 22 wherein the axis is defined by the central point 22.

Figure 2:
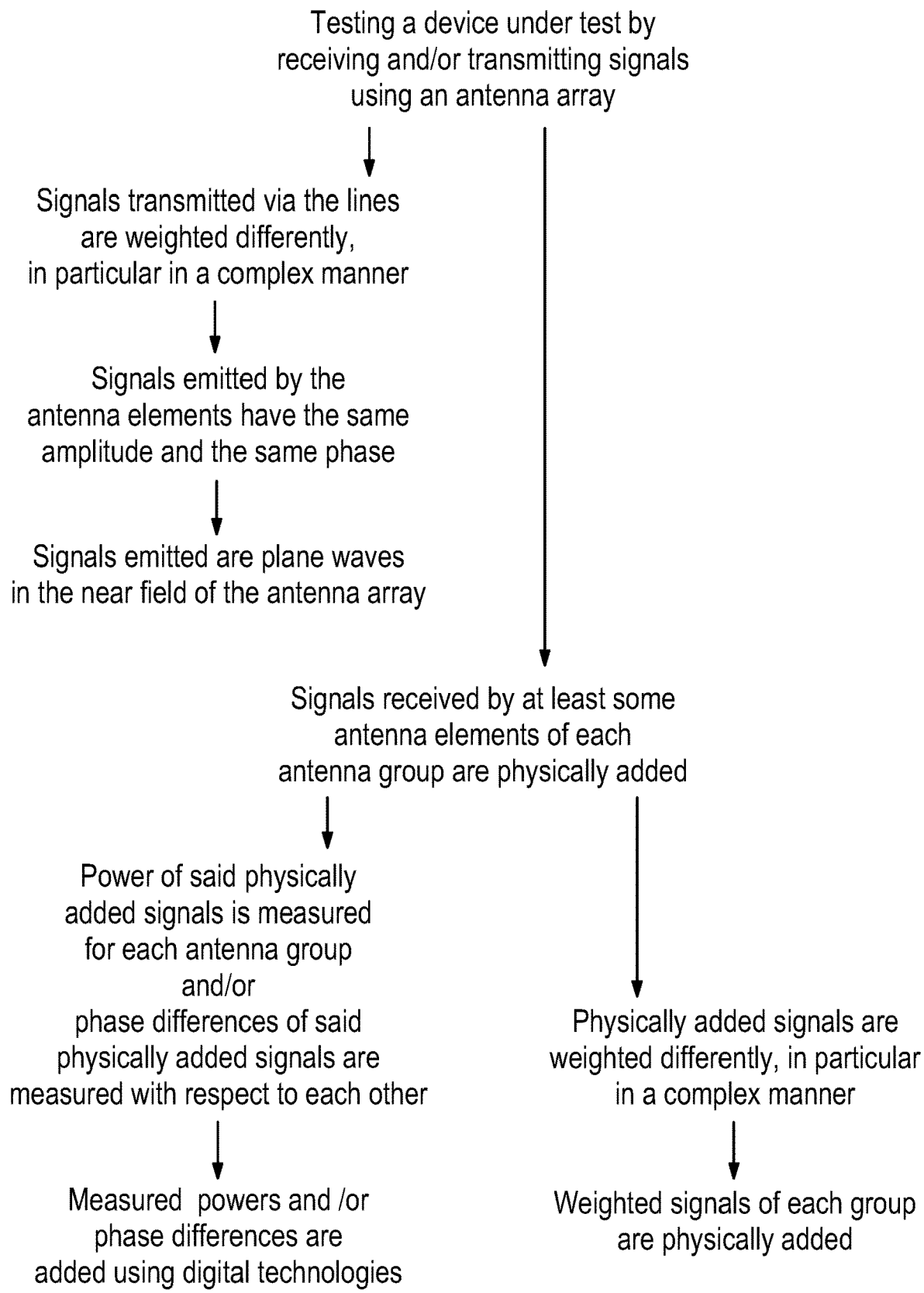

Furthermore, the test system 10 comprises weighting units 24 being arranged in each line 20. Each antenna group 18 may comprise one weighting unit 24 which is connected to the transmitter 14 via the dedicated line 20. The individual antenna elements 16 of each antenna group 18 are connected with the corresponding weighting unit 24. These weighting units 24 may each comprise phase shifter and/or attenuators as will be described hereinafter with reference to FIG. 2 showing a flow-chart of a method for transmitting or receiving signals using the test system 10 as well as the antenna array 12 shown.

Accordingly, the test system 10 used for transmission purposes is installed in a testing facility for product testing, in particular measuring and/or calibrating communication systems or devices.

A device under test (not shown) is placed at a certain distance to the antenna array 12 which transmits electromagnetic signals. Particularly, the device under test is placed in the near field of the antenna array 12.

The transmitter 14 generates electromagnetic currents which are converted into electromagnetic waves by the antenna elements 16. The individual signals transmitted via the antenna elements 16 of each antenna group 18 have the same phase and the same amplitude. As already discussed with reference to FIG. 1, the several antenna elements 16 are located in a certain arrangement resulting in predefined characteristics of the signals emitted by the antenna array 12.

Accordingly, the lines 20 used for feeding the antenna groups 18, in particular their antenna elements 16, are weighted differently with respect to each other ensuring a specified electromagnetic signal transmitted by the whole antenna array 12. In other words, the currents transmitted via the lines 20 to the antenna elements 16 are weighted depending on the antenna group 18 to which the antenna elements 16 belong to since the respective antenna group 18 defines the location of the antenna elements 16 with respect to the central point 22 of the antenna array 12.

The weighting units 24 are used to weight the corresponding signals appropriately, in particular adapting the amplitude by attenuators as well as the phase by phase shifters.

Since the weighting units 24 are arranged in the lines 20, the lines 20, in particular the signals transmitted via the lines 20, connected with the corresponding antenna groups 18 are weighted appropriately.

In another embodiment, the test system 10 can be used for receiving signals emitted by a device under test wherein the several antenna elements 16 are used for converting electromagnetic waves received into currents to be analyzed by a receiver 26. The receiver can be provided instead of the transmitter 14. Alternatively, a transceiver can be used having transmission and receiving properties.

The signals emitted by the device under test are received by all antenna elements 16 of each antenna group 18. The signals received by the antenna elements 16 of each antenna group 18 are physically added in groups in order to obtain physically added signals for each antenna group 18 which can be used for further processing.

Then, the physically added signals are weighted using the weighting units 24 located in the lines 20 which are used as transmission lines since the received electromagnetic waves are converted into currents by the antenna elements 16. Depending on the position of the antenna group 18, in particular the antenna elements 16, the signals received are differently weighted by the weighting units 24.

Afterwards, the weighted signals of each antenna group 18 are physically added in order to obtain a total signal corresponding to the signal emitted by the device under test.

Thus, it is ensured that all signals received by the antenna elements 16 are used and processed wherein the signals are weighted previously to take the location of the antenna elements 16 of the antenna groups 18 into account.

Besides the weighting of the physically added signals, the powers of all antenna groups 18 may be measured as well as the phase differences between the signals of each antenna group 18 with respect to each other. After this information has been gained, the powers and phase differences of each antenna group 18 can be added by using digital technologies. Hence, the total power and phase information of the signal emitted by the device under test is obtained.

Generally, only selected antenna elements 16 of each antenna group 18 can be used for physical addition. Hence, a certain selection is provided which ensures that only those signals are processed which are useful.

In general, said antenna array 12 is configured to emit electromagnetic waves in at least two polarization directions, in particular two linear polarization directions. The antenna elements 16 can be controlled by a separate controller, the receiver 26 or the transmitter 14 such that the electromagnetic waves emitted may be vertically or horizontally polarized. Accordingly, the antenna array 12 can also be used to receive differently polarized electromagnetic waves, in particular horizontally and vertically polarized electromagnetic waves.

The individual antenna elements 16 may be circular polarized.

In general, the antenna array 12 may be configured such that the individual antenna elements 16 may be arranged in different planes being parallel with respect to each other, in particular one after the other when viewing on the front face of the antenna array 12. Hence, several planes of antenna elements 16 are provided which are arranged adjacent to each other. Thus, the antenna elements 16 are provided in all spatial directions. As already mentioned, the central point 22 of the antenna array 12 defines an axis of symmetry since the different antenna groups 18 are axially symmetrical to the central point 22 of the antenna array 12.

In general, the electromagnetic waves emitted may be plane waves at a certain distance being in the near field of the antenna array 12 wherein the device under test is located within the near field of the antenna array 12. Hence, the device under test is located in the plane wave zone of the antenna array 12. Generally, the antenna array 12 may be part of a plane wave converter, in particular an axially symmetric plane wave converter. The generation of plane waves is simplified.

The invention claimed is:

1. Antenna array comprising a plurality of antenna elements and a central point, said antenna elements being grouped in at least two antenna groups, said antenna elements of each antenna group emitting coherent signals, and said antenna groups each being arranged symmetrically to the central point of said antenna array, wherein the at least two antenna groups have different radii with respect to the central point, wherein the central point of the antenna array defines a same single point on an axis of symmetry with the different antenna groups each being axially symmetrical in a circular or semi-circular arrangement with respect to the central point of the antenna array, and wherein said antenna array is configured to emit plane waves in the near field of the antenna array, wherein said antenna array is configured to weight signals emitted via the different antenna groups differently such that electromagnetic waves emitted by said antenna array are plane waves at a distance being in the near field of said antenna array.

2. The antenna array according to claim 1, wherein said coherent signals have the same phase and the same amplitude.

3. The antenna array according to claim 1, wherein said antenna groups are arranged such that an n-fold symmetry is provided wherein n is minimum 3 and an integer value.

4. The antenna array according to claim 1, wherein each antenna group is connected with at least one line, preferably exact one line.

5. The antenna array according to claim 1, wherein said antenna array is configured to emit electromagnetic waves in at least two polarization directions, in particular two linear polarization directions.

6. The antenna array according to claim 1, wherein said antenna elements are circular polarized.

7. The antenna array according to claim 1, wherein said antenna elements are arranged in all spatial dimensions.

8. A method for testing a device under test by transmitting and/or receiving signals using an antenna array according to claim 1, wherein said antenna elements of one group receive signals and/or emit the same signals in amplitude and phase.

9. The method according to claim 8, wherein said signals emitted via the different antenna groups are weighted differently, in particular in a complex manner.

10. The method according to claim 8, wherein said signals received by at least some antenna elements of each antenna group are physically added, in particular by all antenna elements of each antenna group.

11. The method according to claim 10, wherein said physically added signals are weighted differently.

12. The method according to claim 11, wherein said physically added signals are weighted in a complex manner.

13. The method according to claim 11, wherein said weighted signals of each group are physically added.

14. The method according to claim 10, wherein the power of said physically added signals is measured for each antenna group and/or phase differences of said physically added signals are measured with respect to each other.

15. The method according to claim 14, wherein said measured powers and/or phase differences are added using digital technologies.

16. A test system comprising an antenna array according to claim 1, wherein a transmitter, a receiver or a transceiver is provided that is connected with said antenna array by at least one line transmitting signals between the antenna array and the transmitter or receiver.

17. The test system according to claim 16, wherein said test system is configured such that said lines are weighted differently, in particular in a complex manner.

18. The test system according to claim 17, wherein said test system is configured such that said complex weights depend on the frequency and/or time.

19. The test system according to claim 16, wherein said test system comprises attenuators and/or phase shifters using for weighting said signals transmitted via said lines.

* * * * *